(12) United States Patent
Bellin

(10) Patent No.: US 8,349,040 B2
(45) Date of Patent: Jan. 8, 2013

(54) METHOD FOR MAKING COMPOSITE ABRASIVE COMPACTS

(75) Inventor: Federico Bellin, Orem, UT (US)

(73) Assignee: Smith International, Inc., Houston, TX (US)

( * ) Notice: Subject to any disclaimer, the term of this patent is extended or adjusted under 35 U.S.C. 154(b) by 701 days.

(21) Appl. No.: 12/499,679

(22) Filed: Jul. 8, 2009

(65) Prior Publication Data
US 2010/0005728 A1   Jan. 14, 2010

Related U.S. Application Data

(60) Provisional application No. 61/134,373, filed on Jul. 8, 2008.

(51) Int. Cl.
*B24D 18/00* (2006.01)
*B24D 99/00* (2010.01)
*C09C 1/68* (2006.01)
*H05B 6/64* (2006.01)
*H05B 7/00* (2006.01)

(52) U.S. Cl. ............... 51/293; 51/307; 51/309; 264/241; 264/332; 264/432; 264/434

(58) Field of Classification Search ........... 175/327–435
See application file for complete search history.

(56) References Cited

U.S. PATENT DOCUMENTS

| | | |
|---|---|---|
| 3,745,623 A | 7/1973 | Wentorf, Jr. et al. |
| 3,949,062 A | 4/1976 | Vereschagin et al. |
| 4,097,274 A | 6/1978 | Bakul et al. |
| 4,188,194 A | 2/1980 | Corrigan |
| 4,505,746 A | 3/1985 | Nakai et al. |
| 4,525,179 A | 6/1985 | Gigl |
| 5,127,923 A * | 7/1992 | Bunting et al. ............... 51/293 |
| 5,158,148 A | 10/1992 | Keshavan |
| 5,169,572 A | 12/1992 | Matthews |
| 5,271,749 A | 12/1993 | Rai et al. |
| 5,718,736 A | 2/1998 | Onishi et al. |
| 5,848,348 A | 12/1998 | Dennis |

(Continued)

FOREIGN PATENT DOCUMENTS

DE    198 45 151 A1    4/2000

(Continued)

OTHER PUBLICATIONS

Groza et al., Nanostructured Bulk Solids by Field Activated Sintering, Jun. 23, 2003, Reviews on Advanced Materials Science, 5, pp. 24-33.*

(Continued)

*Primary Examiner* — Roy King
*Assistant Examiner* — Jared Wood
(74) *Attorney, Agent, or Firm* — Christie, Parker & Hale, LLP

(57) ABSTRACT

The present invention relates to polycrystalline ultra hard material cutting elements, and more particularly to a method of forming a polycrystalline ultra hard material cutting element with a thicker ultra hard layer than cutting elements formed by prior art methods. In an exemplary embodiment, such a method includes pre-sintering the ultra hard material powder to form an ultra hard material layer that is partially or fully densified prior to HPHT sintering, so that the ultra hard layer is pre-shrunk. This pre-sintering in an exemplary embodiment is achieved by means of a spark plasma process, or in another exemplary embodiment by a microwave sintering process.

29 Claims, 3 Drawing Sheets

U.S. PATENT DOCUMENTS

| | | | |
|---|---|---|---|
| 5,889,219 | A | 3/1999 | Moriguchi et al. |
| 6,004,505 | A * | 12/1999 | Roy et al. .................... 419/6 |
| 6,346,689 | B1 | 2/2002 | Willis et al. |
| 6,485,533 | B1 | 11/2002 | Ishizaki et al. |
| 6,858,173 | B2 | 2/2005 | Zhan et al. |
| 6,875,374 | B1 | 4/2005 | Zhan et al. |
| 6,905,649 | B2 | 6/2005 | Zhan et al. |
| 6,976,532 | B2 | 12/2005 | Zhan et al. |
| 7,148,480 | B2 | 12/2006 | Zhan et al. |
| 2003/0134135 | A1 | 7/2003 | Noda |
| 2004/0150140 | A1 | 8/2004 | Zhan et al. |
| 2004/0167009 | A1 | 8/2004 | Kuntz et al. |
| 2004/0201137 | A1 | 10/2004 | Zhan et al. |
| 2004/0261978 | A1 | 12/2004 | Zhan et al. |
| 2005/0067607 | A1 | 3/2005 | Zhan et al. |
| 2005/0133963 | A1 | 6/2005 | Zhan et al. |
| 2005/0173840 | A1 | 8/2005 | Wan et al. |
| 2005/0245386 | A1 | 11/2005 | Zhan et al. |
| 2006/0011839 | A1 | 1/2006 | Zhan et al. |
| 2008/0014444 | A1 | 1/2008 | Reineke |
| 2008/0073127 | A1 | 3/2008 | Zhan et al. |
| 2008/0314568 | A1 | 12/2008 | Zhan et al. |
| 2010/0005728 | A1 | 1/2010 | Bellin |
| 2010/0005729 | A1 | 1/2010 | Zhan et al. |
| 2010/0294571 | A1 | 11/2010 | Belnap et al. |

FOREIGN PATENT DOCUMENTS

| | | |
|---|---|---|
| JP | 56-128612 | 10/1981 |
| JP | 2002 069560 A | 3/2002 |
| JP | 2002 220628 A | 8/2002 |
| WO | WO 2004/077521 A2 | 9/2004 |
| WO | WO 2006/027675 A1 | 3/2006 |
| WO | WO 2006027675 A1 * | 3/2006 |

OTHER PUBLICATIONS

L. Girardini et al., WC-Co Consolidation by Means of Spark Plasma Sintering, 2006, Euro PM 2006 : Congress & Exhibition : proceedings, Shrewsbury UK: EPMA, 2006, p. 139-144.*

J.R. Groza and A. Zavaliangos, *Nanostructured Bulk Solids by Field Activated Sintering* (Journal), Jun. 23, 2003, 10 Pages, Advanced Study Center Co. Ltd., Davis CA and Philadelphia, PA, USA.

L. Girardini, M. Zadra, F. Casari and A. Molinari, *WC-Co Consolidation by Means of Spark Plasma Sintering* (Journal), Oct. 23-25, 2006, 19 Pages, University of Trento, Dept. of Materials Engineering and Industrial Technologies, Italy.

SPS Syntex Inc., What's SPS, *Principles and Mechanism of the SPS Process*, Website, <http://www.scm-sps.com/e_htm/whatsps_e_htm/whatsps4_e.htm>, Apr. 24, 2008, 3 Pages, Kanagawa, Japan.

The International Search Report and the Written Opinion of the International Searching Authority, or the Declaration, dated Feb. 17, 2010, for International Application No. PCT/US2009/049958, Filed Jul. 8, 2009.

Casari, Francesco et al.; *Design of Layered Metal-Ceramic FGMs Produced by Spark Plasma Sintering*; Multiscale and Functionally Graded Materials; AIP Conference Proceedings; vol. 973; 2006; pp. 832-837; 6 Pages.

Girardini, L. et al.; *Bulk fine grained and nanostructured binderless WC consolidated by Spark Plasma Sintering*; Proceeding Euro PM2007; Tolouse, France; Oct. 17-19, 2007; pp. 1-7; 7 Pages.

Khor; K. A. et. al.; *Post-Spray Treatment of Plasma Sprayed Yttria Stabilized Zirconia (YSZ) Electrolyte with Spark Plasma Sintering (SPS) Technique*; May 10-12, 2004; ITSC 2004 International Thermal Spray Conference 2004: Advances in Technology and Application; Osaka; Japan; pp. 27-31; 5 Pages.

Hungria; Teresa et al.; *Grain Growth Control in NaNbO3-SrTiO3 Ceramics by Mechanosynthesis and Spark Plasma Sintering*; J. Am. Ceram. Soc.; 90 [7]2122-2127 (first published online Jun. 6, 2007); 6 Pages.

Holke, R., et al.; *Sintering of Diamond-Cemented Carbide-Composites*; Euro PM2006—Diamond Tooling; Ultrahard Coatings & Materials; pp. 167-172; 6 Pages.

Miyamoto, Yoshinari et al.; *Fabrication of New Cemented Carbide Containing Diamond Coated with Nanometer-Sozed SiC Particles*; Journal of the American Ceramic Society; Malden, MA, USA; vol. 86, No. 1, pp. 73-76; Jan. 1, 2003; 4 Pages.

Sang Yoo et al.; Scripts Materials, *Diffusion Bonding of Boron Nitride on Metal Substrates by Plasma Activated Sintering (Pas) Process*; Department of Chemical Engineering and Materials Science, Department of Mechanical Engineering; University of California, Davis; vol. 34, No. 9, pp. 1383-1386; May 1, 1996; 4 Pages.

* cited by examiner

Figure 1
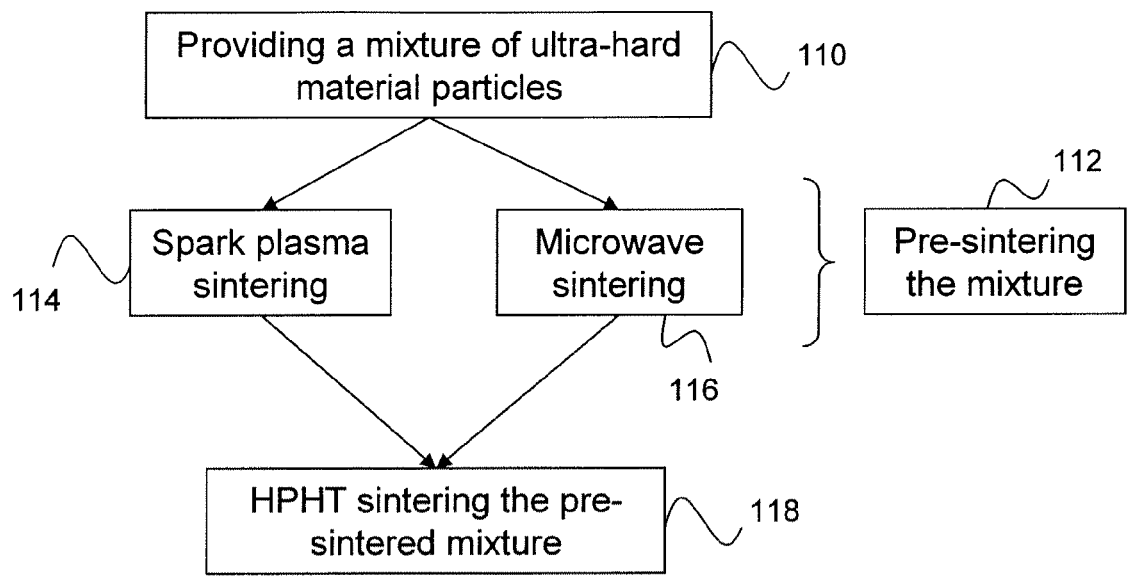
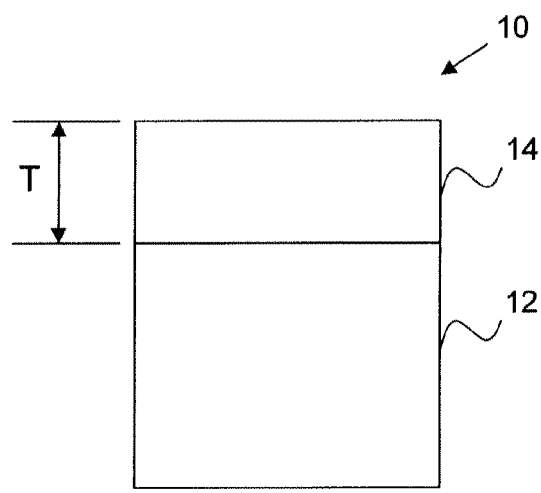
Figure 3

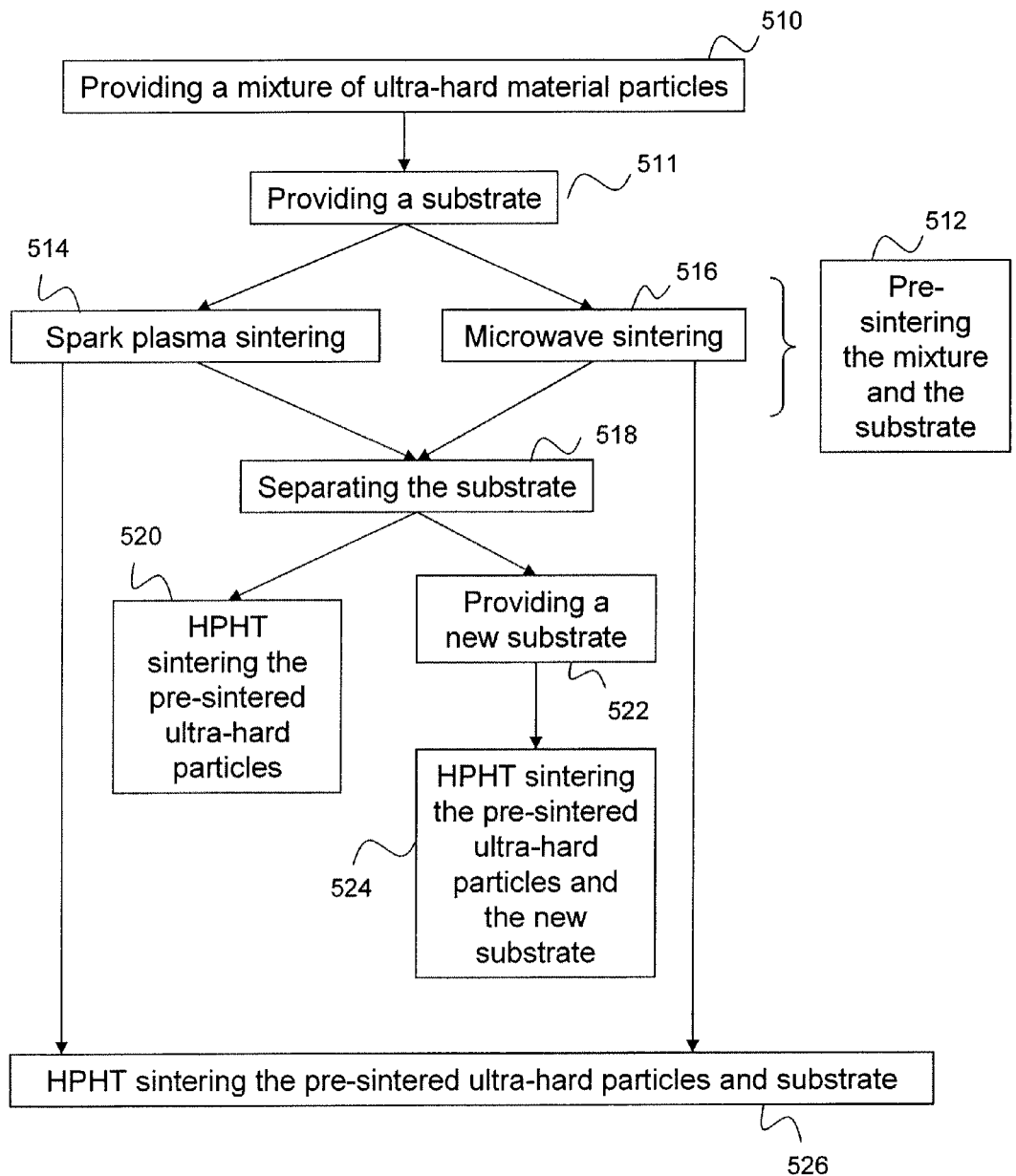

METHOD FOR MAKING COMPOSITE ABRASIVE COMPACTS

CROSS-REFERENCE TO RELATED APPLICATION

This application claims the benefit of and priority to U.S. Provisional Application No. 61/134,373, filed on Jul. 8, 2008, the contents of which are fully incorporated herein by reference.

BACKGROUND OF THE INVENTION

Polycrystalline ultra hard material composite abrasive compacts such as cutting elements or shear cutters include a cutting layer such as polycrystalline diamond ("PCD") or polycrystalline cubic boron nitride ("PCBN") or thermally stable polycrystalline ultra hard material ("TSP") formed over a substrate such as a cemented tungsten carbide substrate. Such compacts have well-known applications in the industry. For example, they may be mounted on a rock bit and used for oil, gas drilling and mining operations. These compacts are produced by sintering ultra hard material particles (typically provided in powder form), such as diamond or cubic boron nitride (CBN) particles, over a tungsten carbide substrate at a high pressure and high temperature (HPHT sintering) where the ultra hard material is thermodynamically stable. These temperatures and pressures are typically in the range of 1300° C. to 1600° C. and 5 to 7 GPa, respectively.

Many commercially available polycrystalline ultra hard material layer compacts, such as PCD cutting elements, are formed in accordance with the teachings of U.S. Pat. No. 3,745,623, the contents of which are fully incorporated herein by reference, whereby a relatively small volume of ultra hard particles is sintered in a thin layer of approximately 0.5 to 1.3 mm onto a cemented tungsten carbide substrate. While the teachings of U.S. Pat. No. 3,745,623 utilize a belt press in the disclosed sintering process, it is also known that a cubic press or a Piston-Cylinder (PC) press may also be used.

Generally, to form the polycrystalline ultra hard compact, the ultra hard material along with a cobalt, iron or nickel binder is placed in an enclosure typically referred to as a "can" formed from a refractory metal material such as, for example, niobium, molybdenum or tantalum. The ultra hard material is typically provided in powder form, such as diamond or CBN powder, and may be mixed with a binder or catalyst such as tungsten, cobalt, iron, or nickel, also provided in powder form. A cemented or pre-sintered tungsten carbide substrate is then placed over the ultra hard material in the can. The can is covered with a cover made from the same material as the can. The can and its contents are then placed in a high pressure cell of a high pressure press and are subjected to the HPHT sintering process. The HPHT sintering causes the ultra hard material to convert to a polycrystalline ultra hard material such as PCD or PCBN having intercrystalline bonding between the ultra hard material particles. A catalyst material (such as cobalt) mixed into the ultra hard powder mixture prior to sintering assists in the formation of the polycrystalline structure and facilitates intercrystalline bonding between the ultra hard particles. Alternatively or in addition, catalyst from the substrate infiltrates into the ultra hard layer from the adjacent substrate during sintering and assists in the intercrystalline bonding.

Prior art cutting elements have ultra-hard layers of various thicknesses. Semi-round inserts have a thickness of about 1 mm, and flat chamfered product diamond thickness is up to 2.5 mm. Shear cutters typically have an ultra hard layer that is up to 2 mm thick. A thicker ultra hard material layer is desirable in a compact, as a thicker ultra hard material layer has increased impact and wear resistance. However, an increase in the thickness of the ultra hard material layer may result in delamination of the ultra hard material layer from the substrate due to residual stresses generated at the interface between the ultra hard material and the substrate. During HPHT sintering, the ultra hard material powder shrinks relative to the substrate (which is typically solid or sintered tungsten carbide). In addition, the substrate has a higher coefficient of thermal expansion than does the ultra hard material. As a result, when the substrate and the ultra hard particles are heated during HPHT sintering, the substrate expands to a greater extent than the ultra hard particles. During the cooling down phase of the sintering process, the substrate thermally contracts more than the ultra hard layer does. Also, during HPHT sintering, the ultra hard layer is compacted due to pressure and due to crushing of the particles. The high pressure during HPHT sintering causes both the substrate and the ultra hard layer to become more compact, although, depending on the particle sizes and distributions, they may shrink or consolidate by different amounts. Both of these effects, the particle consolidation and the thermal expansion and cooling, generate residual stresses in the substrate and ultra hard layer near the interface between these two layers.

The relative shrinkage between the ultra hard powder and the substrate increases as the volume and thickness of the ultra hard material layer increases. Consequently, the magnitude of the stresses generated during the HPHT sintering process at the interface, between the ultra hard material and the substrate, increases as the thickness of the ultra hard material layer increases. The increased stresses can cause delamination of the ultra hard material layer from the substrate. As such, the maximum thickness of the sintered ultra hard material layer is limited by the magnitude of these stresses.

Additionally, the shrinkage of the ultra hard material causes a pressure drop in the pressure cell of the high pressure apparatus, which reduces the magnitude of the pressure applied by the press and hinders the HPHT sintering process. If the amount of shrinkage is too high, the press may not be able to apply sufficient pressure to HPHT sinter the material, resulting in a weaker compact. Furthermore, as previously discussed, due to the elastic modulus and coefficient of thermal expansion mismatch between the ultra hard material and the substrate, high residual stresses arise during the cooling down phase of the HPHT sintering process, which ultimately leads to spalling and poor performance of the ultra hard material layer. Consequently, compacts having a better operational performance are desired.

SUMMARY OF THE INVENTION

The present invention relates to polycrystalline ultra hard material cutting elements, and more particularly to a method of forming a polycrystalline ultra hard material cutting element with a thicker ultra hard layer than cutting elements formed by prior art methods. In an exemplary embodiment, such a method includes pre-sintering the ultra hard material powder to form an ultra hard material layer that is partially or fully densified prior to HPHT sintering, so that the ultra hard layer is pre-shrunk. Applicant has discovered that by pre-sintering, a thicker ultra hard material layer can be produced. This pre-sintering in an exemplary embodiment is achieved by means of a spark plasma process, or in another exemplary embodiment by a microwave sintering process.

In an exemplary embodiment, a method of forming a polycrystalline ultra hard material includes providing a mixture of ultra hard material particles; placing the mixture into an enclosure; pre-sintering the mixture in the enclosure to pre-shrink mixture, by spark plasma sintering or by microwave sintering; and HPHT sintering the pre-sintered mixture to create a polycrystalline ultra hard material. In an embodiment, the mixture is pre-shrunk by about 5-20% by volume.

BRIEF DESCRIPTION OF THE DRAWINGS

FIG. 1 is a flowchart of a method of forming a polycrystalline ultra hard material according to an exemplary embodiment of the invention.

FIG. 3 is a side elevational view of a polycrystalline ultra hard material cutting element formed according to an exemplary embodiment of the invention.

FIG. 4 is a flowchart of a method of forming a polycrystalline ultra hard material according to an exemplary embodiment of the invention.

DETAILED DESCRIPTION OF THE INVENTION

Figure 2:
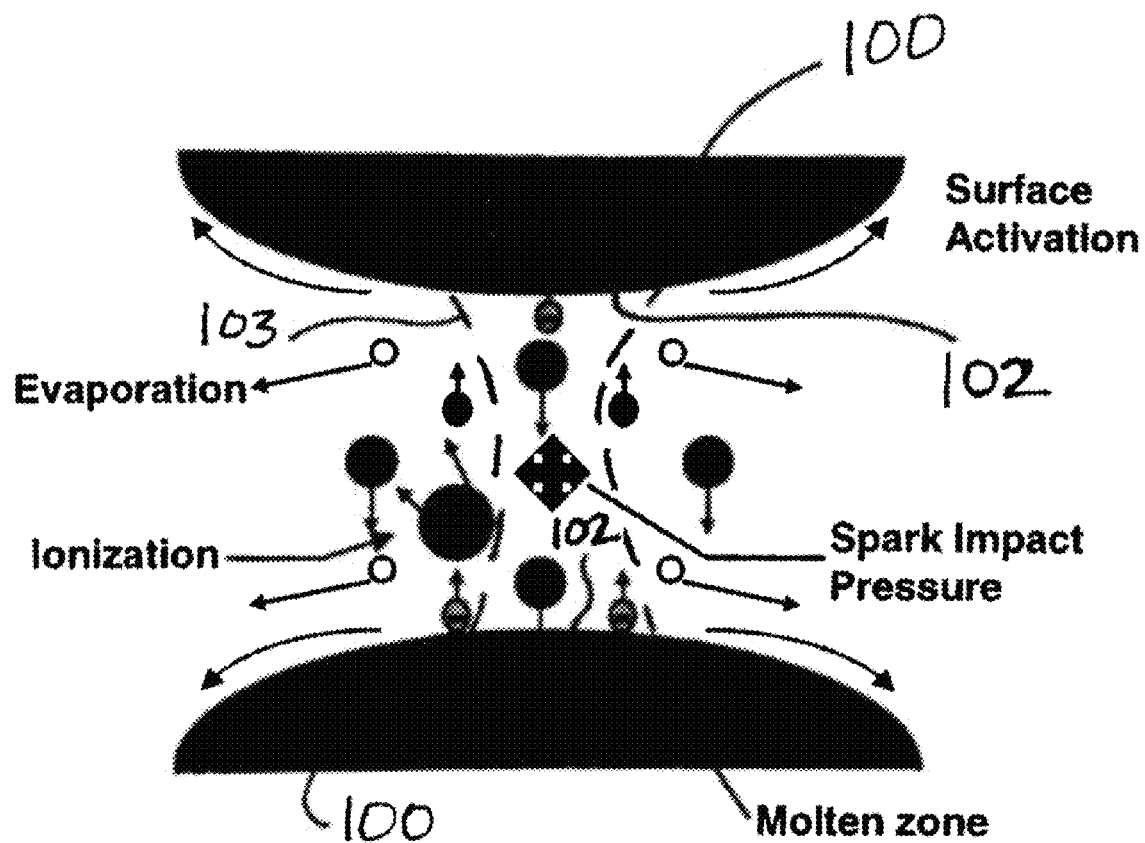
FIG. 2 is an illustration of the effects of spark plasma sintering on two ultra hard material particles.

The present invention relates to polycrystalline ultra hard material cutting elements, and more particularly to a method of forming a polycrystalline ultra hard material cutting element with a thicker ultra hard layer than cutting elements formed by prior art methods. In an exemplary embodiment, such a method includes pre-sintering the ultra hard material powder to form an ultra hard material layer that is partially or fully densified prior to HPHT sintering, so that the ultra hard layer is pre-shrunk. Applicant has discovered that by pre-sintering, a thicker ultra hard material layer can be produced. This pre-sintering in an exemplary embodiment is achieved by means of a spark plasma process, or in another exemplary embodiment by a microwave sintering process.

As the volume of ultra hard material layer increases, the amount of shrinkage during sintering or pre-sintering also increases. This makes it difficult to pre-sinter large volumes of ultra hard particles in the same high pressure press used in HPHT sintering, since the shrinkage may cause a sufficient reduction in the volume of the ultra hard material that renders the press ineffective. Applicant has discovered, however, that ultra hard material may be successfully pre-sintered using a spark plasma sintering process or a microwave sintering process. Such sintering processes are well known in the art. Exemplary spark plasma sintering processes are described in U.S. Pat. Nos. 6,858,173; 6,875,374; and 6,905,649, which are fully incorporated herein by reference, as well as in the articles entitled, "Wc-Co Consolidation by Means of Spark Plasma Sintering," by L. Girardini, M. Zadra, F. Casari and A. Molinari, Proceeding EURO PM2006, Belgium (October 2006); "Bulk Fine Grained and Nanostructured Binderless WC Consolidated by Spark Plasma Sintering," by L. Girardini, M. Zadra, F. Casari and A. Molinari, Proceeding EURO PM2007, France (October 2007); and "Design of Layered Metal-Ceramic FGMs Produced by Spark Plasma Sintering," by F. Casari, M. Zadra, L. Girardini and A. Molinari, AIP Conference Proceedings, Vol. 973, pp. 832-837 (2008), all three of which are fully incorporated herein by reference. Microwave sintering processes are described in U.S. Pat. Nos. 5,848,348 and 6,004,505 the contents of which are fully incorporated herein by reference.

FIG. 1 shows a method of forming a polycrystalline ultra hard material according to exemplary embodiments of the invention. The method includes providing a mixture of ultra hard material particles 110. This mixture may be in powder form, such as diamond or CBN particles in powder form. The mixture may include other components in addition to the ultra hard particles, such as sintering aids such as catalysts or binders. In one embodiment, the ultra hard particles are mixed with WC and/or catalyst metals such as cobalt, iron, or nickel, or a combination thereof.

The method then includes pre-sintering the ultra hard mixture 112. As mentioned above, pre-sintering is performed in order to pre-shrink the ultra hard mixture prior to HPHT sintering. This pre-shrinking reduces the relative shrinkage between the ultra hard layer and the substrate during HPHT sintering, thereby reducing the residual stresses at the interface between these layers. As a result, delamination between the ultra hard layer and the substrate is less likely, even with thicker ultra hard layers which have high impact and wear resistance. In exemplary embodiments, pre-sintering can be done either by spark plasma sintering 114 or microwave sintering 116.

In spark plasma sintering 114, repeated high-energy electric pulses are applied to the ultra hard material to heat the material and cause it to at least partially densify. In one embodiment, the ultra hard particle mixture is placed into an enclosure, such as a can, and the can is placed in a graphite enclosure such as a graphite cup. The can may be made from a refractory metal such as for example niobium, tantalum, or molybdenum. A pulse generator, such as a direct current (DC) pulse generator, is electrically coupled to the graphite cup and applies high amperage direct current to the graphite. The current then passes from the graphite through the can and through the ultra hard mixture inside, raising the temperature of the ultra hard mixture and the can. In exemplary embodiments, the pulse generator generates electric pulses having an amperage in the range of 1 to 10,000 amperes and a voltage of about 5 to 10 volts. Between pulses, no current is applied. The pulse duration and the duration of the time between pulses can vary. A shorter time between pulses can be used to generate higher temperatures. In exemplary embodiments, the pulse duration is between 2-5 milliseconds, and the time between pulses is between 3-20 milliseconds. In one embodiment, each pulse lasts for about 3 milliseconds, and the time between pulses is about 5 milliseconds. During this process, as the pulses are generated, in one exemplary embodiment the press applies a pressure of about 50 MPa to the can enclosure to assist in compacting and preshrinking the ultra hard particles inside the can.

This pre-sintering process thus involves low pressure and high current, such as 20 MPa and 10,000 A, respectively. For reference, during conventional HPHT sintering involves high pressure and low current, such as 5 GPa and 1,000 A. Also, during conventional HPHT sintering, this low current is applied to the heater surrounding the ultra hard mixture, and the current does not pass directly through the ultra hard mixture itself. By contrast, in exemplary embodiments using spark plasma pre-sintering, the high current is passed directly through the ultra hard material, such as through the graphite assembly described above.

In an exemplary embodiment, the applied pulse is a high energy, low voltage spark pulse current that generates a spark plasma at high localized temperatures between the ultra hard material particles in the ultra hard layer. These localized high temperatures between the particles may be as high as a few thousand to thirty thousand ° C. The spark discharge appears in the gaps between the ultra hard particles, momentarily applying high heat to the surfaces 102 of the particles 100, as illustrated in FIG. 2. This high localized heat causes vaporization and the melting of the surfaces 102 of the ultra hard material particles, creating a molten zone at the surface. Repeated pulsing causes this molten zone to form constricted shapes or "necks" 103 around the contact area between particles. These necks gradually develop and plastic transformation progresses, causing the ultra hard particles to flow together and move into the interstitial spaces between the particles. As a result, the ultra hard layer shrinks and becomes at least partially densified.

An example of microwave sintering is described in U.S. Pat. Nos. 5,848,348 and 6,004,505. In microwave sintering, pulses of applied to heat the ultra hard layer, similar to the pulses described above for spark plasma sintering. However, instead of using a high energy current, microwaves are applied to the ultra hard layer in order to increase the temperature. In an embodiment, the ultra hard material is heated to temperatures between about 1,350 to 1,500° C. during microwave pre-sintering.

In both pre-sintering processes (spark plasma sintering and microwave sintering), the temperature to which the ultra hard particles are heated during pre-sintering may depend on the amount of cobalt in the mixture of ultra hard particles being pre-sintered. As mentioned above, the mixture of ultra hard particles may include sintering aids or binders mixed with the ultra hard particles. For example, cobalt can be added to the ultra hard mixture to act as a catalyst to aid inter-crystalline bonding during HPHT sintering. A mixture with a lower cobalt content is pre-sintered at a higher temperature, and vice versa. Cobalt is a catalyst that aids the sintering process, so higher temperatures are used with lower cobalt content, and vice versa. Depending on the amount of cobalt, the effective pre-sintering material temperature may be in the range of 1,200° C. to 4,000° C. Pre-sintering temperatures at the upper range are expected when pre-sintering diamond mixed with only tungsten carbide and no cobalt. Notably, these temperatures refer to the overall temperature of the ultra hard layer during pre-sintering, not the much higher localized temperatures that can be created by spark plasma sintering, as described above. Plasma spark temperatures can reach 10,000 to 30,000° C., while the material temperatures reach 1,200 to 4,000° C. The material temperature is lower than the temperature applied during HPHT sintering, so that the ultra hard mixture is not actually sintered during the pre-sintering process.

For example, in an exemplary embodiment the ultra hard mixture includes about 75% by volume diamond powder and 25% by volume tungsten carbide and cobalt, also in powder form. For this mixture, pre-sintering 112 includes heating to a temperature of about 2000° C., by either spark plasma sintering 114 or microwave sintering 116. In another exemplary embodiment, diamond powder is mixed with tungsten carbide, molybdenum carbide, or molybdenum tungsten carbide, and cobalt. In a further exemplary embodiment no cobalt is used and the pre-sintering temperature is greater than 2000° C. In another exemplary embodiment, the mixture has a cobalt content up to about 30% by volume, and the pre-sintering temperature is about 1200° C.

During pre-sintering 112, the temperature is ramped up to a maximum value, optionally held there for a certain duration (the "soak" time), and then ramped back down. Typical pre-sintering soak times when using a spark plasma process are expected to be between one and two minutes but usually no longer than a minute. Overall cycling time including heating and cooling is around 6 minutes or less. For microwave pre-sintering, soak times are about 5 to 45 minutes.

In exemplary embodiments, during both spark plasma sintering 114 and microwave sintering 116, an axial pressure of about 50 MPa is applied to the ultra hard material during the pre-sintering to help compact and pre-shrink the ultra hard material mixture. The pressure applied during pre-sintering is outside of the range of high pressures that are applied during HPHT sintering to fully sinter the material. The pressure can range from 0 MPa (no pressure applied) to about 50 MPa.

Finally, referring again to FIG. 1, the method includes HPHT sintering the pre-sintered mixture 118 in order to form a polycrystalline ultra hard material. In an exemplary embodiment, the pre-sintered ultra hard material layer is placed in a can adjacent a substrate, such as a tungsten carbide substrate, and the can is then placed in a pressure cell of a high pressure press where it is subjected to conventional HPHT sintering to form a polycrystalline ultra hard material layer bonded to the substrate. Alternatively, the pre-sintered ultra hard mixture can be HPHT sintered without a substrate. During HPHT sintering 118, a polycrystalline structure forms, with inter-crystalline bonding between the ultra hard particles, and the ultra hard layer becomes fully densified.

It exemplary embodiments, the ultra hard particles are pre-coated before they are subjected to spark plasma or microwave pre-sintering. This coating is provided in order to improve the sintering of the particles during HPHT sintering by improving the wettability of the ultra hard particles. This improves compaction and reduces the residual porosity between the particles, creating more uniform and complete sintering. In one embodiment, titanium carbide is used as the coating. The coating may be applied by conventional coating techniques such as chemical vapor deposition, physical vapor deposition, and atomic layer deposition.

When a substrate is present, the HPHT sintering produces a sintered polycrystalline ultra hard compact such as cutting element 10, as shown in FIG. 3. The cutting element 10 includes a substrate 12 such as a cemented tungsten carbide substrate bonded to a polycrystalline ultra hard layer 14 such as PCD or PCBN. The ultra hard layer may have a higher thickness T than prior art cutting elements without suffering from delamination. Because the ultra hard material layer is at least partially, if not fully, densified during the pre-sintering 112, the ultra hard material layer is pre-shrunk prior to the HPHT sintering 118 and undergoes less or no shrinkage during the HPHT sintering process. Consequently, the stresses generated at the interface between the ultra hard material layer 14 and the substrate 12 due to the shrinkage mismatch between them are reduced or alleviated. As such, a compact formed by methods according to exemplary embodiments of the invention can have a thicker ultra hard material layer (a larger thickness T) without being subject to delamination. In fact, there appears to be no limitation on the thickness T of the polycrystalline sintered ultra hard material layer that can be achieved by embodiments of the invention. Since the shrinkage of the ultra hard material layer is minimized during the HPHT sintering process, compacts formed using this process will have minimal residual stresses and thus improved performance.

Moreover, because the ultra hard material layer undergoes less or no shrinkage during HPHT sintering 118, the variation in pressure during HPHT sintering can be avoided. As explained above, the shrinkage of the ultra hard material during HPHT sintering causes a pressure drop in the pressure cell of the high pressure apparatus, which reduces the pressure applied by the press and hinders the HPHT sintering process. By pre-sintering 112, the pressure applied to the pressure cell during HPHT sintering 118 can be maintained at a high pressure, which results in more uniform and complete sintering.

In exemplary embodiments, the thickness of the ultra hard layer is about 30-50% by volume greater as compared to prior art layers. For example, in one embodiment, a shear cutter has an ultra hard layer with a thickness of at least 3 mm, compared to prior art shear cutters having a thickness of 2 mm. In another embodiment, a semi-round insert has an ultra hard layer with a thickness of at least 2 mm, compared to prior art semi-round inserts with a thickness of 1 mm. In another embodiment, a flat chamfered product diamond thickness is at least 3.5 mm, compared to prior art thickness of 2.5 mm.

In another exemplary embodiment, the ultra hard material is pre-sintered along with a substrate using a spark plasma or a microwave process, as shown in FIG. 5. The method includes providing a mixture of ultra hard material particles 510 and providing a substrate 511. For example, a mixture of ultra hard material powder, tungsten carbide, and cobalt forming a first layer is placed adjacent a mixture of tungsten carbide powder and cobalt forming a second layer. The first layer forms the ultra hard layer, and the second layer forms the substrate. The first layer can include two or more layers of ultra hard particles of different compositions, such as multiple layers of different particle grain sizes. The substrate can be a pre-sintered, fully dense tungsten carbide substrate, rather than a powder layer. The method then includes pre-sintering both the ultra hard particles and the substrate or substrate layer 512 such as by spark plasma sintering 514 or microwave sintering 516. This pre-sintering causes the ultra hard layer to partially densify and pre-shrink, as described above. Subsequently, in one embodiment, the pre-sintered ultra hard layer and substrate are then HPHT sintered 526 to form a layer of polycrystalline ultra hard material bonded to the substrate. In yet further exemplary embodiments, the method includes separating the pre-sintered ultra hard material layer from the substrate 518 after pre-sintering 512, and then either HPHT sintering the ultra hard particles alone 520 or providing a new substrate 522 and HPHT sintering the ultra hard particles in combination with the new substrate 524 to form a layer of polycrystalline ultra hard material bonded to the new substrate.

As this invention has been described herein by way of exemplary embodiments, many modifications and variations will be apparent to those skilled in the art. Accordingly, it is to be understood that the invention described herein may be embodied other than as specifically described herein. For example, in another exemplary embodiment, the pulse generator used may be an alternating current pulse generator.

What is claimed is:

1. A method of forming a polycrystalline ultra hard material comprising:
    providing a mixture of ultra hard material particles, wherein the ultra hard material particles are selected from the group consisting of diamond particles, cubic boron nitride particles, and combinations thereof;
    placing the mixture into an enclosure;
    pre-sintering the mixture in the enclosure to pre-shrink the mixture, by spark plasma sintering or by microwave sintering; and
    high pressure high temperature sintering the pre-sintered mixture to create a polycrystalline ultra hard material.

2. The method of claim 1, wherein said pre-sintering comprises pre-shrinking the mixture by about 5 to 20% by volume.

3. The method of claim 1, wherein said pre-sintering comprises spark plasma sintering the mixture.

4. The method of claim 3, wherein said spark plasma sintering comprises applying repeated pulses of direct current to the enclosure to heat the mixture and applying a pressure to the enclosure.

5. The method of claim 4, wherein said spark plasma sintering comprises heating the mixture to a maximum temperature between about 1200° C. and 4000° C.

6. The method of claim 5, wherein the mixture includes about 75% by volume ultra hard material powder and 25% by volume tungsten carbide and cobalt, and wherein said spark plasma sintering comprises heating the mixture to a maximum temperature of about 2000° C.

7. The method of claim 5, wherein the mixture contains no cobalt, and wherein said spark plasma sintering comprises heating the mixture to above 2000° C.

8. The method of claim 5, wherein the mixture includes about 30% cobalt by volume, and wherein said spark plasma sintering comprises heating the mixture to about 1200° C.

9. The method of claim 4, wherein the pressure is about 50 MPa.

10. The method of claim 4, wherein the pulses have a duration of about 3 milliseconds.

11. The method of claim 4, wherein the pulses have an amperage between about 1 and about 10,000 amperes.

12. The method of claim 4, wherein the pulses have a voltage between about 5 and about 10 volts.

13. The method of claim 4, further comprising pre-coating the ultra hard material particles with a coating prior to said pre-sintering.

14. The method of claim 13, wherein the coating is titanium carbide.

15. The method of claim 1, wherein the high pressure high temperature sintered polycrystalline ultra hard material has a thickness of at least 3 mm.

16. The method of claim 1, wherein said pre-sintering comprises microwave sintering.

17. The method of claim 16, wherein said microwave sintering comprises applying microwaves to the mixture for about 5 to 45 minutes to heat the mixture to between about 1,350 to 1,500° C.

18. The method of claim 1, wherein said high pressure high temperature sintering comprises sintering the mixture with a substrate to create a cutting element having a polycrystalline ultra hard material layer.

19. The method of claim 1, wherein said pre-sintering the mixture comprises pre-sintering the mixture with a substrate.

20. The method of claim 19, further comprising removing the substrate after said pre-sintering and prior to said high pressure high temperature sintering.

21. The method of claim 20, further comprising providing a second substrate and high pressure high temperature sintering the mixture with the second substrate.

22. A method of forming an abrasive compact having a polycrystalline ultra hard material layer, comprising:
    providing a mixture of ultra hard material particles, wherein the ultra hard material particles are selected from the group consisting of diamond particles, cubic boron nitride particles, and combinations thereof;
    placing the mixture into an enclosure;
    pre-sintering the mixture in the enclosure to pre-shrink the mixture, by spark plasma sintering or by microwave sintering; and
    high pressure high temperature sintering the pre-sintered mixture adjacent a substrate to create a compact having a polycrystalline ultra hard material layer.

23. The method of claim 22, wherein said pre-sintering the mixture comprises pre-sintering the mixture with the substrate.

24. The method of claim 22, wherein said pre-sintering the mixture comprises pre-sintering the mixture with a second substrate, and wherein the method includes removing the second substrate prior to said high pressure high temperature sintering.

25. A method of forming a polycrystalline ultra hard material comprising:
providing a mixture of ultra hard material particles;
placing the mixture into an enclosure;
pre-sintering the mixture, in the enclosure to pre-shrink the mixture, by spark plasma sintering; and
high pressure high temperature sintering the pre-sintered mixture to create a polycrystalline ultra hard material,
wherein spark plasma sintering comprises applying repeated pulses of direct current to the enclosure to heat the mixture and applying a pressure to the enclosure, and wherein spark plasma sintering comprises heating the mixture to a maximum temperature between about 1200° C. and 4000° C.

26. The method of claim 25, wherein the mixture includes about 75% by volume ultra hard material powder and 25% by volume tungsten carbide and cobalt, and wherein said spark plasma sintering comprises heating the mixture to a maximum temperature of about 2000° C.

27. The method of claim 25, wherein the mixture contains no cobalt, and wherein said spark plasma sintering comprises heating the mixture to above 2000° C.

28. The method of claim 25, wherein the mixture includes about 30% cobalt by volume, and wherein said spark plasma sintering comprises heating the mixture to about 1200° C.

29. The method of claim 25, wherein the pressure is about 50 MPa.

* * * * *